March 26, 1940.   D. D. DOOLEY   2,194,823
DUAL RANGE TRANSMISSION
Filed Feb. 19, 1938   3 Sheets-Sheet 1
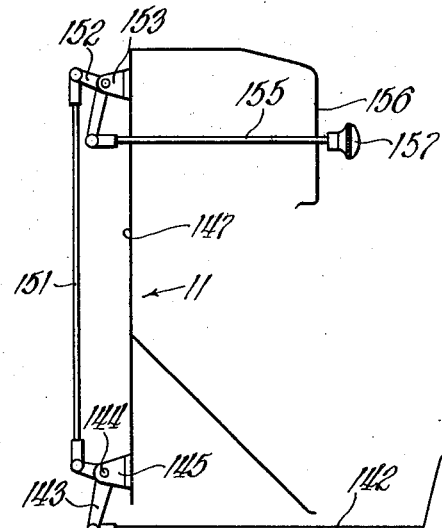
Fig. 1.
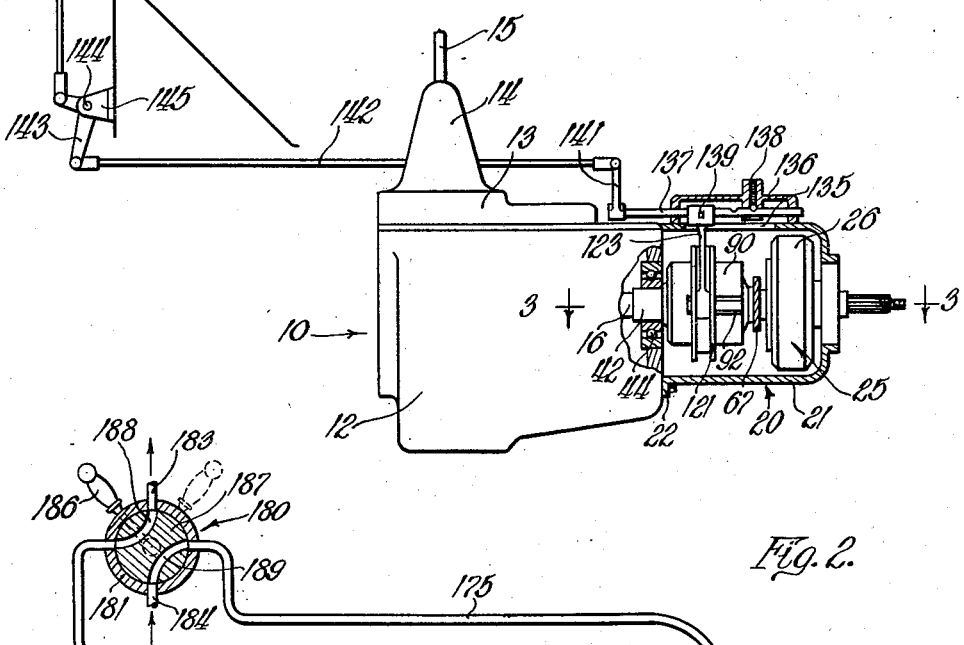
Fig. 2.
Inventor
Detmar D. Dooley
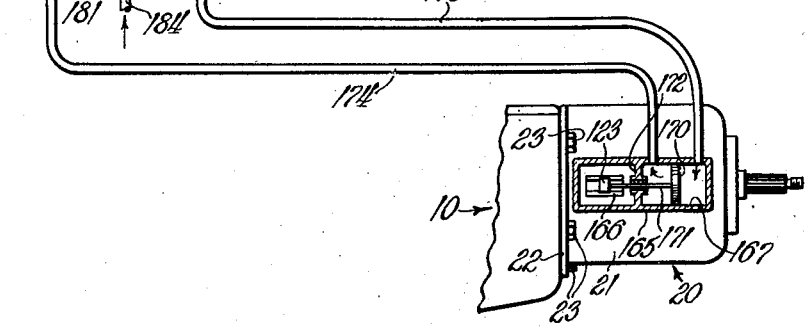
Attys.

Inventor
Detmar D. Dooley

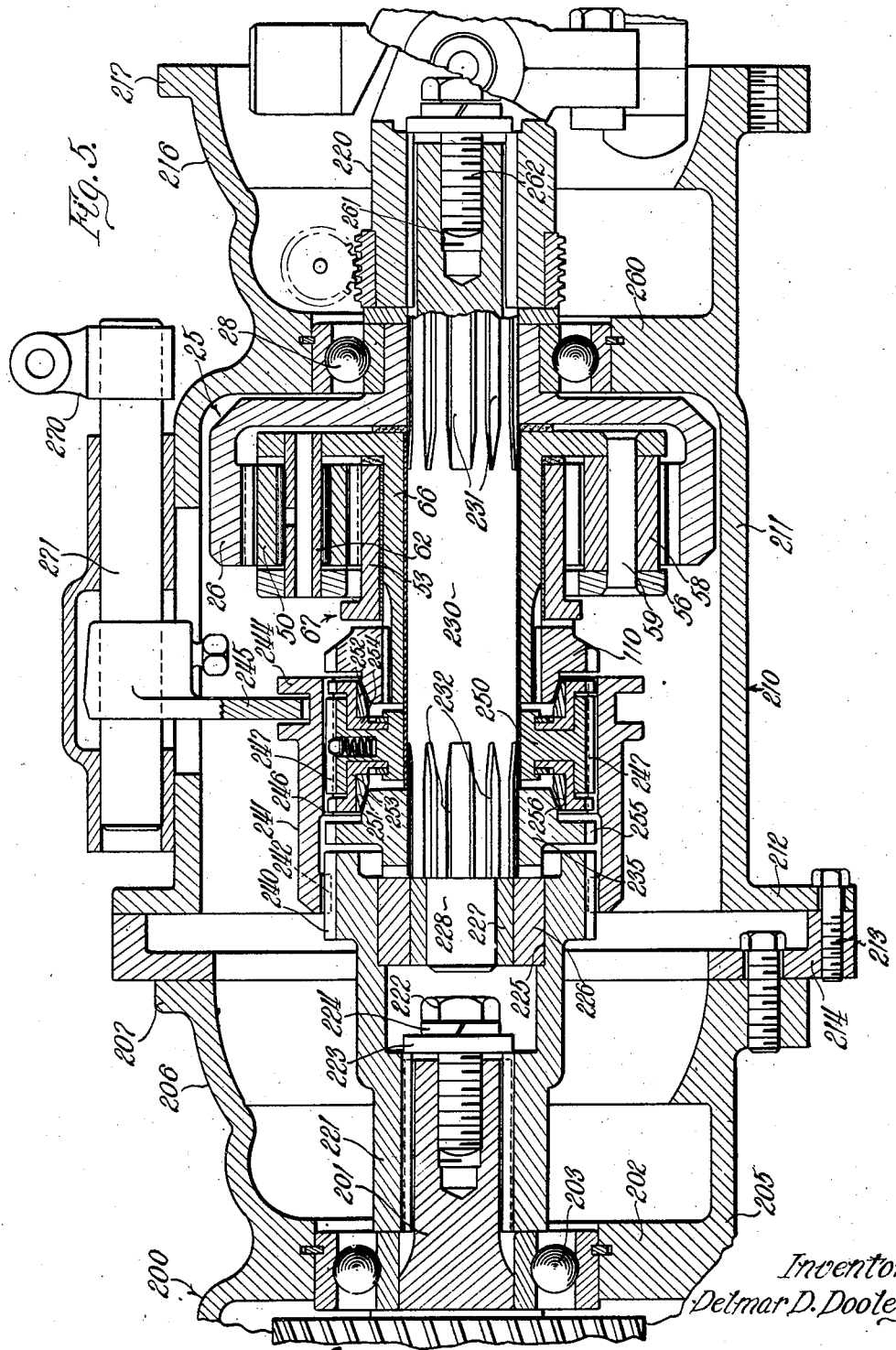

Patented Mar. 26, 1940

2,194,823

UNITED STATES PATENT OFFICE 2,194,823

DUAL RANGE TRANSMISSION

Delmar D. Dooley, Rock Island, Ill., assignor of one-fourth to Clarence H. Dooley, Rock Island, Ill., one-fourth to H. Keith Dooley, Los Angeles, Calif., and one-fourth to Herbert C. Snow, Auburn, Ind.

Application February 19, 1938, Serial No. 191,434

5 Claims. (Cl. 74—280)

The principal object of the present invention is the provision of a dual range transmission unit adapted to be connected to a conventional transmission or gear box, preferably at the driven or output end thereof, so that, without requiring any change in the standard transmission or the gear shifting control for the same, other than the mounting of the auxiliary unit on the rear of the transmission housing, the operator has the option of two speed ranges in any available ratio that the operator may select in the conventional transmission.

Auxiliary units of this character are generally used in association with automobile transmissions so as to secure what is usually termed an overdrive in order to secure increased car speeds without increasing the speed of the motor. Overdrive units of this character are usually then made in two forms, one a unit incorporated in a special transmission and the other incorporated in a special type of rear axle. Usually, also, such units have been automatically controlled or provided with a semi-automatic control, which make such units quite complicated, especially in the overdrive transmission type in which speed determining governor mechanism was incorporated. Moreover, units of this latter type required specially constructed transmissions with the result that they could not be employed with conventional transmissions.

An important object, therefore, of the present invention is the provision of a small, lightweight yet sturdy auxiliary or dual range transmission which, with very simple changes, can be used with conventional transmissions and can be incorporated as an attachment to automobiles already manufactured and in use.

A further object of the present invention is the provision of a dual range auxiliary transmission which does not include any governors, friction clutches, or the like but which can be shifted at any time, whether the automobile is at rest or in motion, to select the range or ratio desired.

A further object of the present invention in this connection is the provision of a separate control of a simple mechanical or power actuated construction whereby the operator at any time may select direct or overdrive, entirely independently of the speed of the car or the ratio that may be selected in the conventional transmission.

Another important feature of this invention is the provision of a dual range overdrive transmission providing two available ratios selected by clutch mechanism that incorporates synchronizing means, thus making it possible in this way to permit the operator to select either ratio at any time it is desired to do so, simply by disengaging the engine clutch and making the desired shift in the usual manner and as simply as a selected ratio is engaged in a conventional transmission having synchronizing means.

Another important object of the present invention is the provision of a dual range overdrive transmission in the nature of an attachment for a conventional transmission and which can be inexpensively manufactured and sold, and which is sturdy, compact and long lived and in which the moving parts are accurately supported and held in proper alignment.

These and other objects and advantages of the present invention will be apparent to those skilled in the art after a consideration of the following detailed description of the preferred form of my invention, taken in conjunction with the accompanying drawings illustrating the same.

In the drawings:

Figure 1 is a view, partly diagrammatic in character, illustrating the application of a dual range transmission unit to a conventional automobile transmission and controlled by a simple operator-actuated mechanism;

Figure 2 is a modified form of controlling means for the auxiliary transmission, whereby the latter may be shifted by power, such as, for example, vacuum from the intake manifold of the motor;

Figure 5 is a section, similar to Figure 3, illustrating a modified form of my invention incorporating certain improvements over the form shown in Figure 3.

Figure 3:
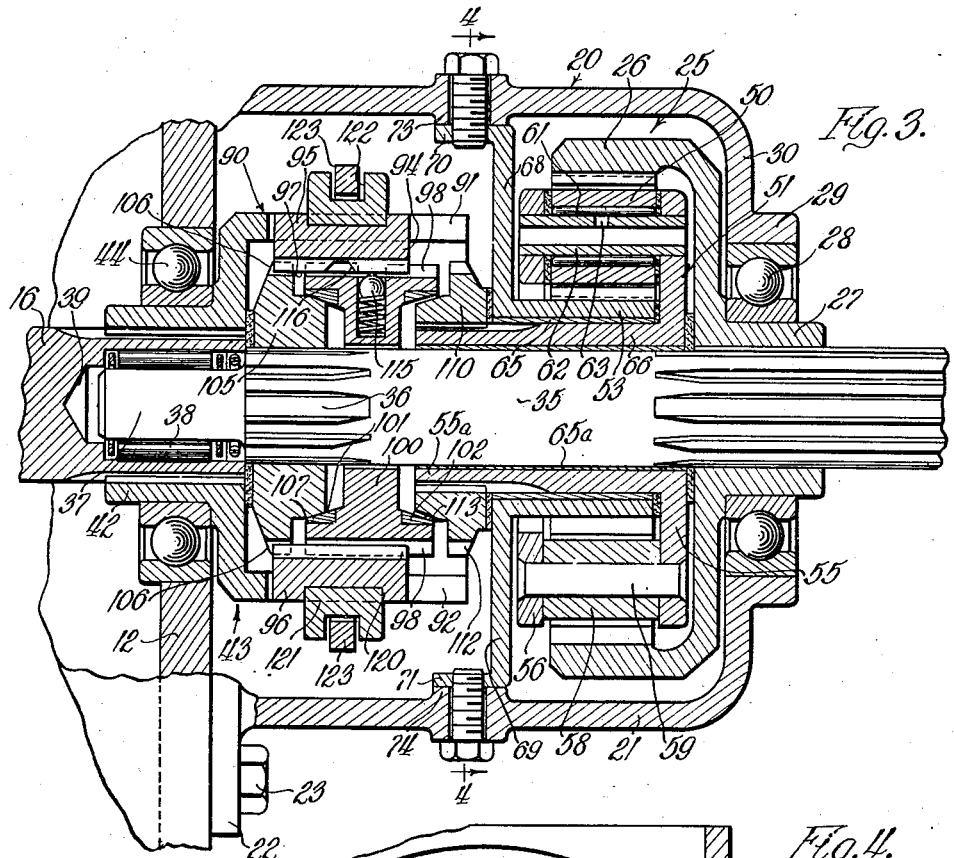
Figure 3 is an enlarged horizontal section taken along the line 3—3 of Figure 1 and showing the details of my dual range transmission unit.

Referring now more particularly to Figure 1, the conventional automobile transmission is indicated at 10 and is mounted in the usual manner in an automobile or other vehicle indicated generally at 11. The transmission 10 includes a housing 12, a cover 13 having pedestal 14, and a conventional gear shift lever 15 supported for longitudinal and lateral movement on the pedestal 14 and arranged to control the usual transmission gears (not shown) enclosed within the transmission housing 12, through which the main transmission shaft 16 is driven.

The auxiliary dual range transmission unit embodying the principals of the present invention is indicated in its entirety by the reference numeral 20 and comprises a casing 21 having at its forward end a flange 22 by which the housing 21 can be detachably connected to the rear wall of the transmission housing 12 by suitable cap screws 23 or the like.

Referring now more particularly to Figure 3, the auxiliary transmission chosen to illustrate the principles of the present invention includes the mechanism providing either a direct connection or an overdrive. The overdrive is secured by means of an epicyclic gear unit indicated in its entirety by the reference numeral 25 and including a ring gear 26 having a bearing hub portion 27 which receives anti-friction bearing means 28 supported in a flange 29 formed in the rear wall 30 of the housing 21. Suitable sealing means, not shown, is provided for preventing loss of lubricant at this point. The hub 27 of the ring gear 26 is splined and receives the rear end of a driven shaft 35, the forward end of which is also splined, as at 36, and has a reduced end 37 supported by a pilot bearing 38 in a recess 39 formed in the rear end of the transmission main shaft 16. The latter is also splined and receives the hub 42 of a driving member indicated in its entirety by the numeral 43. The hub 42 receives anti-friction bearing means 44 which is carried by the rear wall of the transmission housing 12 and supports the rear end of the driven transmission main shaft 16 through the hub of the member 43. It will be noted that the pilot bearing 38 and the bearing 44 are disposed substantially in the plane of the rear wall of the transmission housing 12. Thus, the forward end of the transmission shaft 35 is supported in the rear wall of the transmission housing 12 while the rear end of the shaft 35 is supported by the rear wall of the auxiliary transmission housing 21.

Figure 4:
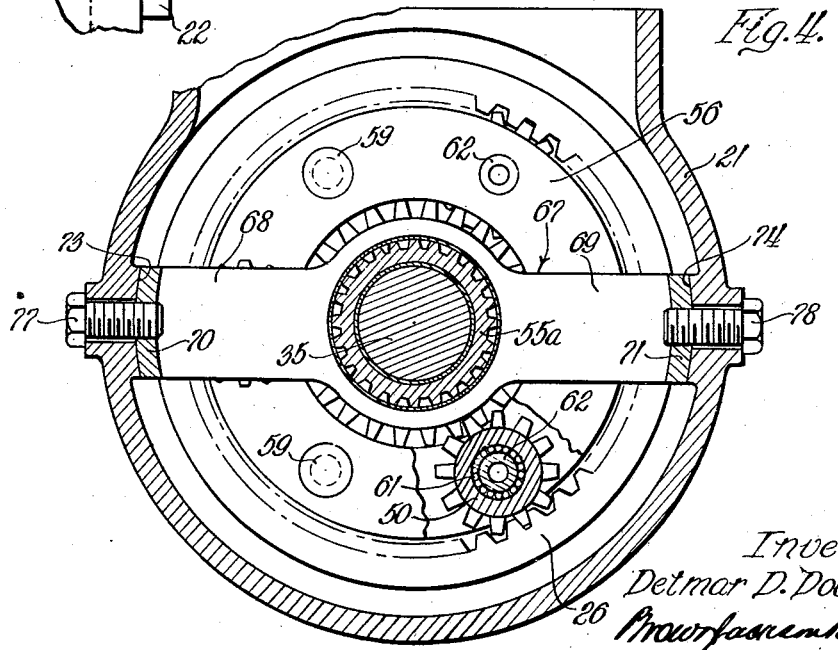
Figure 4 is a section taken along the line 4—4 of Figure 3.

The epicyclic gear unit 25 includes the ring gear 26, described above, a plurality of planet gears 50 which are supported in a gear cage 51, and a sun gear 53, the planet gears 50 being in mesh with the ring gear 26 and the sun gear 53. The planet gear cage or carrier 51 comprises a flanged member 55 and a ring 56 held in spaced apart relation by hollow sleeves 58 and rivets 59 which pass through suitable openings in the ring 56 and the flanged member 55, the spacing sleeves 58 being disposed intermediate the planet gears 50, as best indicated in Figure 4. The planet gears 50 are mounted on needle bearings 61 which are carried on tubular pins 62, each of which has a lubricant recess 63. A bushing 65 is disposed between the sun gear 53 and the hub 66 of the planet carrier member 55, the latter being extended forwardly, as at 55ᵃ and splined as will be referred to later. A bushing 65ᵃ is disposed between the hub section 66 of the member 55 and the driven shaft 35.

The sun gear 53 is fixed to or formed integral with a yoke 67 (Figure 4) having two arms 68 and 69 which are provided with angularly disposed ends 70 and 71, the outer surfaces of which are arcuate about the axis of the shaft 35. The side portions of the housing 21 are formed with pads 73 and 74 which have concave surfaces accurately milled to the same diameter as the exterior of the surfaces of the sections 70 and 71 of the sun gear yoke 67. By virtue of this construction, the milling of the flanged portion 29 and the pads 73 and 74 can be done with the same center setting, thereby providing exceptional accuracy in the alignment of the operating parts. A pair of cap screws 77 and 78 are disposed in openings in the pads 73 and 74 and threaded into the ends 70 and 71 of the sun gear yoke 67, thereby holding the sun gear 53 against rotation.

According to the principles of the present invention, suitable clutch mechanism is provided for optionally connecting either the driven shaft 35 or the gear change unit 25 to receive power from the driven shaft 16 of the transmission 10. The driving member 43, mentioned above, is provided with a generally cylindrical section 90 which has a diameter appreciably larger than the forward end of the driven shaft 35 and is provided with two longitudinally extending openings or slots 91 and 92. A clutch ring 94 is disposed within the section 90 and has two lugs 95 and 96 disposed in the slots 91 and 92, whereby the clutch ring 94 is connected in driving relation to the transmission main shaft 16 through the driving member 43. The shiftable clutch ring 94 is provided with a plurality of radially inwardly directed splines or teeth 97 which engage companion teeth or splines 98 formed on the exterior surface of a synchronizing member 100 having opposed conical synchronizing surfaces 101 and 102. A clutch collar 105 is splined or otherwise fixed to the forward end of the driven shaft 35 and has radially outwardly extending clutch teeth 106 and an inwardly directed synchronizing conical surface 107. A similarly constructed clutch collar 110 is splined or otherwise fixed to the forward end 55ᵃ of the planet gear carrier hub 66, and the member 110 has radially outwardly extending teeth 112 and a conical synchronizing surface 113. The synchronizing member 100 has a recess in which a spring pressed ball 115 is disposed, and the shiftable clutch member 94 is provided with a notch or recess 116 formed in one of the teeth 97 for the purpose of releasably holding the synchronizing member 100 to the shiftable clutch member 94. Synchronizing mechanism of this type is well known and the present invention is not particularly concerned with the details per se of such synchronizing means. The lugs 95 and 96 of the clutch member 94 are grooved, as at 120, and receive a thrust ring 121, the groove 122 of which receives a shift fork 123, best shown in Figure 1.

The mechanism employed for shifting the clutch member 94 of the auxiliary transmission is preferably either a mechanical remote control or a remote control employing some source of power, such as vacuum from the intake manifold of the motor. Referring now to Figure 1, the upper wall of the housing 21 is provided with an opening 135 therein through which the end of the shift fork 123 extends. A closure 136 is disposed over the opening and secured to the housing 21 in any suitable manner. The closure 136 carries a shift rail 137 which is notched to receive a spring pressed detent 138 by which the rail may be held yieldingly in either of two positions. The rail 137 receives the upper end of the shift fork 123 in any suitable manner, and a set screw 139 or any other suitable means may be employed for fixing the shift fork 123 to the rail 137. One end of the rail 137 extends outside the closure 136 and has an arm 141 fixed thereto and which is connected by a link 142 to one arm of a bell crank 143. The latter is pivotally mounted on a pin 144 which is carried by a bracket 145 bolted or otherwise fastened to a part of the automobile, such as the front panel 147. The other arm of the bell crank 143 is connected by a link 151 to another bell crank 152 that is pivoted on a bracket 153. The bell crank 152 is operated by a rod 155 which extends through the panel 147 and through the instrument panel 156 at some point convenient to the driver. Handle 157 is disposed on the rear end of the rod 155.

The operation of the structure so far described is substantially as follows:

Normally the shiftable clutch member 94 (Figure 3) is engaged with either the companion clutch member 105 or the other clutch member 110. In Figure 3 the clutch member 94 is shown as engaging the clutch collar 105, and when the parts are in this position the drive from the main shaft 16 of the transmission 10 is transmitted through the driving member 43 and the clutch collar or ring 94 to the clutch collar 105 that is fixed to the forward end of the driven shaft 35, so that in this position the drive is transmitted directly from the shaft 16 to the driven shaft 35, the shaft 16 in this relation serving as the driving shaft for the transmission unit 20.

When it is desired to transmit the drive to the driven shaft 35 at a higher speed, the operator pulls out on the handle 157, thereby acting through the links 155 and 151 to swing the bell cranks 152 and 143, respectively, in a counter-clockwise direction, thereby exerting a thrust rearwardly through the link 142 and the arm 141 against the shift rail 137. This movement acts through the shift fork 123 to first disengage the teeth 97 from the teeth 106 on the clutch collar 105, the synchronizing detent 115 then entering the notch 116. Continued movement of the shift rail 123 rearwardly first brings the synchronizing cones 102 and 113 into engagement so as to bring the clutch parts 94 and 110 into synchronized rotation. Continued pressure against the shift fork 123 then causes the notch 116 to cam the ball 115 downwardly, permitting the clutch member 94 to move rearwardly after the aforesaid synchronization has taken place into driving engagement with the teeth 112 on the clutch collar 110. When this engagement is effected, the drive is then transmitted from the shaft 16 to the planet gear carrier 51 through the clutch collar 110, and since the sun gear 53 is stationary, the driven shaft 35 to which the ring gear is fixed is driven at an increased rate. When it is again desired to transmit the drive from the transmission 10 in direct, the operator pushes in on the handle 157, which moves the shift fork 123 in the other direction and brings the parts back to the positions shown in Figure 3.

It is to be noted that in making both of these gear changes, the synchronizing cones operate to cause the clutch parts coming into engagement to be synchronized before actual engagement is initiated. It will also be noted that the auxiliary transmission of the present invention adds practically no spinning weight to the transmission so that no difficulty will be encountered in making any desired shift. As a matter of fact, the only part that is added to the usual transmission structure is the driving member 43, and this is a relatively lightweight part and does not materially increase the spinning effect of the gears in the transmission.

If it should be desired to control the dual range transmission unit 20 by power, the construction indicated in Figure 2 may be adopted. In this form of the present invention a casing 165 is attached to one side of the housing 21, and a hole 166 is formed in the housing 21 through which the outer end of the shift fork 123 can be extended. A cylinder 167 is formed in the casing 165 and encloses a piston 170 having a piston rod 171 that extends outwardly through an intermediate wall 172 and is operatively fixed to the shift fork 123 in any suitable manner. A pair of suction tubes 174 and 175 are connected to opposite ends of the cylinder 167 and lead to a valve structure indicated in its entirety by the reference numeral 180. This valve may be of the plug type and has a valve casing 181 into which the tubes 174 and 175 lead at diametrically opposite points. A suction pipe 183 extends from the valve housing 181 to some source of suction, such as the intake of the motor, and diametrically opposite the suction pipe 183 the valve casing 181 has an air inlet 184. The handle 186 is connected in any suitable manner to a plug valve 187 which is provided with bores 188 and 189 which are so arranged that when the handle 186 is disposed in the position shown in full lines in Figure 2, the source of suction 183 is connected to the suction line 174, and the other line 175 is connected through the other bore 189 to the atmospheric inlet. When the parts are in this position, the suction draws the piston 170 to the left, thereby shifting the parts of the dual range transmission into the positions shown in Figure 3. When the valve handle 186 is turned into the position shown in dotted lines, the connections are reversed so that the piston 170 is drawn in the other direction thereby establishing overdrive.

In the auxiliary transmission described above the transmission main shaft 16 has a recess 39 therein especially adapted to receive the forward end 37 of the auxiliary transmission driven shaft 35. In a number of instances the conventional transmission regularly supplied for automobiles and the like do not have a recess such as is indicated at 39 in Figure 3, and in order to provide an auxiliary transmission in the form of an attachment for transmissions of this type that are already in use the construction shown in Figure 5 may be adopted. This form of the present invention requires no change whatsoever in the conventional transmission and is especially constructed so as to be attached to the rear end thereof, the only change necessary in the vehicle being the use of a shorter propeller shaft and torque tube, if any, and the incorporation of the desired control for the auxiliary transmission.

Referring now more particularly to Figure 5, a conventional transmission in use at the present time is indicated by the reference numeral 200 and includes a driven shaft 201 supported in the rear wall 202 of the transmission 200 by suitable anti-friction bearings 203. The transmission housing 205 is extended at 206 to form a casing which encloses the rear splined end of the main shaft 201 and the speedometer driving gear and universal joint usually associated therewith. The casing section 206 is flanged at 207 to receive the inner and outer caps by which the forward or ball end of the torque tube is normally connected to the rear end of the transmission.

According to the principles of the present invention, the housing of the auxiliary transmission, indicated in its entirety by the reference numeral 210, has a flange 212 which is adapted to be secured by bolts 213 to an adapter ring 214, the latter being adapted to be secured directly to the flange 207 that normally receives the universal joint caps mentioned above. The auxiliary transmission casing 211 extends rearwardly and terminates in a section 216 which is formed exactly like the section 206 on the transmission 200, being flanged as at 217 to receive the associated parts of the shortened propeller shaft and torque tube.

The operating parts of the auxiliary transmission shown in Figure 5 are generally the same as described above in connection with Figure 3. The rear splined end of the main transmission shaft 201 has the forward universal joint part 220 removed therefrom and a driving member 221 is secured in place in its stead, preferably by the usual driving cap screw 222 which bears against a ring 223 and has a lock washer 224. The driving member 221 includes an interior recess 225 which receives a bearing ring 226 in which a bushing 227 is disposed. The bushing 227 forms a bearing support for the forward reduced end 228 of the driven shaft 230 of the auxiliary transmission. This shaft is substantially like the shaft 35 shown in Figure 3 and described above, having a rear splined portion 231 and a forward splined section 232. Secured to the forward splined section 232 is a collar 235 which is preferably formed so as to have a permanent rigid attachment with the shaft 230 when pressed thereon. The peripheral portion of the driving member 221 is toothed or splined, as at 240, and receives in driving relation the forward end of a shiftable sleeve 241, the latter having teeth 242 engageable with the teeth or splines 240 on the member 221. The sleeve 241 carries at its rear end a grooved flange 244 which receives the shift fork 245 for controlling the position of the member 241. Another set of teeth 246 are formed on the member 241 and are engaged with the external teeth 247 of a synchronizing member 250 having synchronizing cones 251 and 252 carried in sleeves 253 and 254, respectively, each of which has an outer flange which is in toothed engagement with the interior teeth 246 of the sleeve 241 at all times. The clutch collar 235 is provided with teeth 255 and a conical section 256 which receives the synchronizing cone 251 when the sleeve 241 is shifted forwardly along the splines or teeth 240. The synchronizing mechanism per se employed in the form of invention shown in Figure 5 is otherwise substantially the same as that shown in Figure 3 and described above.

The epicyclic gear unit employed in the form shown in Figure 5 embodies substantially the same parts shown in Figure 3 and described above, and hence no further description of these parts is necessary, the same reference numerals being employed in Figure 5 as in Figure 3 for identical parts. Like the member 235, the clutch collar 110 on the forward end of the planet gear carrier hub 66 is fixed thereto with a press fit so that the two parts are held together rigidly and permanently.

The bearing 28 for the rear end of the auxiliary shaft 230 is carried in the rear wall 260 of the casing 211, the latter being extended rearwardly at 216 as described above. The rear end of the driven shaft 230 of the auxiliary transmission is provided with an internal threaded recess 261 to receive a cap screw 262 substantially identical with the cap screw 222 mentioned above. The forward part 220 of the universal joint, which normally is connected to the rear end of the main transmission shaft 201, is thus fastened rigidly and permanently to the rear end of the auxiliary transmission shaft 230 in substantially the same way that in normal conventional practice it is fastened to the rear end of the main transmission shaft 201. Further, the flange 217 on the auxiliary transmission casing 210 is adapted to receive the same parts that normally are attached to the flange 207.

It will be apparent, therefore, that in Figure 5 I have shown an auxiliary transmission which can be applied to the rear end of a conventional transmission without in any way altering the details of the main transmission. It would also be noted that the auxiliary transmission is especially constructed so as to receive parts of the drive system which are conventionally associated with the rear end of the usual transmission. Thus, the installation and application of my auxiliary transmission shown in Figure 5 is conveniently and quickly accomplished without having to alter any part of the transmission or without any disassembly of the latter. The only change required being that to provide a shortened propeller shaft and torque tube.

The shiftable clutch sleeve 241 and its shift fork 245 may be controlled in any suitable manner, such as by either of the forms of control shown in Figures 1 and 2 connected to the bracket 270 on the shift rail 271 to which the shift fork 245 is secured. It will be noted that the clutch sleeve 241 and associated parts shown in Figure 5, by which the drive may be selectively transmitted either directly or through the epicyclic gear unit 25, is a somewhat simpler construction than the mechanism shown in Figure 3, although the latter is somewhat more compact in a longitudinal direction due to the piloting of the driven shaft 35 in the rear end of the main transmission shaft 16.

Where it is contemplated that an auxiliary transmission might at some time be applied to the main transmission, the latter could be manufactured and supplied to the users with a recess 39 (Figure 3) so as to facilitate the installation of the form of auxiliary transmission shown in Figure 3. However, for existing transmission, it may be preferable to provide the auxiliary transmission shown in Figure 5 as an attachment which will require no changes in the main transmission.

From the above description it will be apparent that I have provided two forms of novel dual range transmissions, each of which is inexpensive to build, has few parts, is relatively short and compact, is easy to assemble, and has no friction clutch or other kind of cushioning device nor any overrunning or centrifugal clutch. The selection of the range is at all times under the control of the driver and the shift can be made at all times and in all speeds, either to accelerate or to brake the car through the use of the engine. Further, little or no change is necessary in the standard conventional transmission and all gear shifting of the latter is the same, except for the mounting of the dual range transmission on the rear of the transmission case and the installation of a driving member on the rear end of the transmission main shaft.

The driver can utilize the low range position of the auxiliary transmission in accelerating from first to third speed position in the transmission in the same manner that the conventional transmission has been used, and then the driver can change over to the overdrive or high speed range.

and then be in that range, if desired, even though the driver may want to drop down to second or even first. In other words, a conventional transmission may be used in a conventional manner, entirely irrespective of whether the dual range transmission is in direct or overdrive. It will be understood that any suitable ratio may be provided by the proper design of the epicyclic gear unit. Preferably, however, as in the constructions shown, in overdrive the propeller shaft is driven approximately thirty per cent faster than in direct drive. It is also to be understood that, if desired, and where the rear axle ratio is high, the epicyclic gear unit may be arranged to provide an underdrive, instead of an overdrive. In this case all that it would be necessary to do would be to reverse the epicyclic gear unit to the extent of connecting the ring gear 26 to the clutch member 110 and connecting the sleeve or hub 66 of the planet gear carrier to the driven shaft. This would place the yoke 67 for the sun gear adjacent the rear of the housing.

While I have shown and described above the preferred structure in which the principles of my invention have been embodied, it is to be understood that my invention is not to be limited to the specific details shown and described above but that, in fact, widely different means may be employed in the practice of the broader aspects of my invention.

What I claim, therefore, and desire to secure by Letters Patent is:

1. A transmission comprising a housing, a driven member mounted for rotation therein, an epicyclic gear unit disposed about said driven shaft and including a driven member connected to drive said driven shaft and a driving part journaled for rotation on said driven shaft and adapted to drive the epicyclic gear unit, a driving member disposed in axial alignment with said driven shaft and including a portion embracing at least a portion of said driving part and the forward end of said driven shaft, said portion of the driving member having means serving as generally axially directed slots therein, generally axially shiftable clutch means disposed within said driving member and having exterior lugs slidable axially in said slots, and means on the forward end of said driven shaft and the forward portion of said epicyclic gear unit driving part adapted selectively to be engaged directly by said shiftable clutch means.

2. A dual range transmission comprising a housing, a planetary gear unit disposed in said housing and including a ring gear having a hub, a plurality of planet gears meshing with said ring gear, a sun gear meshing with said planet gears, a yoke connected to said sun gear, means fixing said yoke to said housing for holding said sun gear against rotation, a shaft in said housing connected to the hub of said ring gear and extending through said sun gear, a planetary gear carrier for said planet gears including a hub section having bearing support on said shaft and extending axially through said sun gear to a point exterior thereof, thrust bearing means between one end of said planet gear carrier and said ring gear, bearing means supporting said ring gear for rotation in said housing and preventing axial movement therebetween, a collar fixed to the outer extended end of said planet gear carrier, bearing means between said collar and said yoke, and bearing means between the inner end of said sun gear and said planet gear carrier.

3. Change speed mechanism as defined in claim 2 in which a driving member is mounted for rotation in the end of the housing opposite the end in which said ring gear is mounted and said shaft has bearing support in said driving member, a collar fixed to said shaft, and thrust bearing means between said collar and said driving member.

4. A dual range transmission comprising a housing, a planetary gear unit disposed in said housing and including a ring gear, a plurality of planet gears meshing with said ring gear, a sun gear meshing with said planet gears, means fixing said sun gear against movement, a shaft in said housing connected to said ring gear and extending through said sun gear, a planetary gear carrier for said planet gears including a hub section having bearing support on said shaft and extending axially through said sun gear to a point exterior thereof, bearing means supporting said ring gear for rotation in said housing and preventing axial movement therebetween, thrust bearing means between one end of said planet gear carrier and said ring gear for preventing axial displacement of the gear carrier in one direction, and bearing means between the sun gear and said planet gear carrier for preventing axial displacement of the latter in the other direction.

5. A dual range transmission comprising a housing, a planetary gear unit disposed in said housing and including a ring gear, a plurality of planet gears meshing with said ring gear, a sun gear meshing with said planet gears, means fixing said sun gear against movement, a shaft in said housing connected to said ring gear and extending through said sun gear, a planetary gear carrier for said planet gears including a hub section having bearing support on said shaft and extending axially through said sun gear to a point exterior thereof, bearing means supporting said ring gear for rotation in said housing and preventing axial movement therebetween in at least one direction, thrust bearing means between the inner end of said sun gear and said planet gear carrier, a collar fixed to the outer extended end of the hub section of said planet gear carrier, and thrust bearing means between said collar and the other end of said sun gear.

DELMAR D. DOOLEY.